United States Patent
Tyrrell et al.

(10) Patent No.: US 9,474,120 B2
(45) Date of Patent: Oct. 18, 2016

(54) ACCURATE MAINS TIME-BASE FOR LED LIGHT DRIVER

(71) Applicant: Dialog Semiconductor (UK) Limited, London (GB)

(72) Inventors: Julian Tyrrell, Swindon (GB); Sander Heuvelmans, Borne (NL); Nebojsa Jelaca, Graz (AT); Gary Hague, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 24 days.

(21) Appl. No.: 14/884,850

(22) Filed: Oct. 16, 2015

(65) Prior Publication Data

US 2016/0119992 A1 Apr. 28, 2016

(30) Foreign Application Priority Data

Oct. 22, 2014 (DE) .......... 10 2014 221 489

(51) Int. Cl.
*H05B 33/08* (2006.01)

(52) U.S. Cl.
CPC ...... *H05B 33/0845* (2013.01); *H05B 33/0815* (2013.01)

(58) Field of Classification Search
None
See application file for complete search history.

(56) References Cited

U.S. PATENT DOCUMENTS

| | | | |
|---|---|---|---|
| 8,400,079 B2 * | 3/2013 | Kanamori | H05B 33/0809 315/194 |
| 2010/0213870 A1 | 8/2010 | Koolen | |
| 2011/0291583 A1 | 12/2011 | Shen | |
| 2012/0274877 A1 * | 11/2012 | Sasaki | G09G 3/3406 349/69 |
| 2012/0319621 A1 | 12/2012 | Sutardja et al. | |
| 2013/0049619 A1 | 2/2013 | Gray et al. | |
| 2014/0239830 A1 | 8/2014 | Kiyota | |
| 2015/0264755 A1 * | 9/2015 | Hsia | H05B 33/0815 315/294 |
| 2015/0327340 A1 * | 11/2015 | Siessegger | H05B 33/0818 315/200 R |

FOREIGN PATENT DOCUMENTS

| | | |
|---|---|---|
| DE | 102010043699 | 1/2012 |
| EP | 2 720 517 | 4/2014 |
| EP | 2 750 477 | 7/2014 |

OTHER PUBLICATIONS

German Search Report and English Translation 10 2014 221 489.0, Jul. 3, 2015, Dialog Semiconductor (UK) Ltd.

* cited by examiner

*Primary Examiner* — Dedei K Hammond
(74) *Attorney, Agent, or Firm* — Saile Ackerman LLC; Stephen B. Ackerman

(57) ABSTRACT

A controller for a driver circuit of a solid state lighting (SSL) device is described. The driver circuit comprises a power converter to transfer energy from AC mains voltage to the SSL device. The controller determines a dim level for the SSL device. The controller also determines a synchronization signal by comparing a voltage derived from the input voltage with a pre-determined threshold. The controller determines a sequence of PWM pulses based on the synchronization signal. The controller operates the power converter in a first operation mode for supplying energy to the SSL device at a first energy level within the sequence of PWM pulses, and operates the power converter in a second operation mode in between the PWM pulses. The second energy level is lower than the first energy level and the first energy level and/or a width of the PWM pulses depend on the dim level.

28 Claims, 7 Drawing Sheets

ACCURATE MAINS TIME-BASE FOR LED LIGHT DRIVER

TECHNICAL FIELD

The present document relates to driver circuits for solid state lighting (SSL) devices. In particular, the present document relates to driver circuits which are configured to reduce or remove flicker of SSL devices, notably at relatively low dimming levels.

BACKGROUND

Solid State Lighting (SSL) light bulb assemblies, e.g. Light Emitting Diode (LED) based light bulb assemblies, are expected to replace GLS (General Lighting Service) or incandescent lamps. SSL devices typically comprise a driver circuit and/or power converter in order to convert electric power from a mains supply to electric power suitable for an SSL light source comprised within the SSL device (e.g. an array of LEDs).

SUMMARY

The driver circuit for an SSL device should be configured to convert the AC mains voltage into a possibly constant load voltage and a load current. In particular, the driver circuits should be configured to control the load voltage (also referred to as the drive voltage) and the load current (also referred to as the SSL current) such that the SSL device does not flicker in a manner which is visible to the human eye. Furthermore, driver circuits should be configured to drive an SSL device at different dimming levels. The emitted light of the SSL device should not exhibit any visible flicker, even at relatively low dimming levels. The present document addresses the above mentioned technical problem of SSL devices and describes an efficient method and system for driving a SSL device without visible flicker. According to an aspect, a controller for a driver circuit of a solid state lighting (SSL) device is described. The SSL device may comprise one or more light emitting diodes (LEDs). The driver circuit comprises a power converter configured to transfer energy from an input of the driver circuit to the SSL device. The power converter may comprise an isolating or a non-isolating power converter. Alternatively or in addition, the power converter may comprise a linear regulator. The power converter may comprise an inductor (e.g. a transformer) configured to store energy from the input of the driver circuit and release the stored energy towards the SSL device. Furthermore, the power converter may comprise a power switch which is arranged in series with the inductor and which is configured to enable an inductor current through the inductor, when the power switch is in on-state. In particular, the power switch (which may comprise e.g. a metal oxide semiconductor, MOS, transistor) may be put into on-state to store energy within the inductor, and the power switch may be put into off-state to release the energy towards the SSL device. By way of example, the power converter may comprise a fly-back power converter.

The energy at the input of the driver circuit may be derived from the AC mains voltage at a mains frequency. The AC mains voltage typically comprises a sequence of cycles (at the mains frequency) or a sequence of half-cycles (at twice the mains frequency). The input voltage of the power converter may be derived from a rectified version of the AC (alternating current) mains voltage (also referred to as the rectified input voltage or as the rectified AC mains voltage). The input voltage typically varies in accordance to a cycle frequency (which may be twice the frequency of the mains voltage, i.e. the cycle frequency may be twice the mains frequency). The mains frequency may correspond to 50 Hz or 60 Hz. The AC mains voltage may exhibit or may have a waveform comprising a sequence of full-waves. The full-waves may be repeated within the waveform at the mains frequency. Each full-wave may be subdivided into two-half waves. The waveform of the rectified AC mains voltage may comprise noise and/or distortions. This may lead to variations of the cycle frequency and/or to variations of the duration of the half-cycles of the rectified AC mains voltage.

The controller may be configured to determine a dim level for the SSL device. The dim level may be derived based on information comprised within the waveform of the AC mains voltage (e.g. based on a modulation of the waveform and/or based on a phase-cut angle). Alternatively or in addition, the dim level may be determined based on information which has been received on a separate communication channel (e.g. via Bluetooth or via Wireless LAN).

The controller may be configured to operate the power converter in a first operation mode for supplying energy to the SSL device at a first energy level. The first energy level of energy may be sufficiently high such that the SSL device emits visible light.

For operating the power converter in the first operation mode, the controller may be configured to repeatedly put the power switch to on-state, subject to detecting freewheeling of the inductor, and to put the power switch to off-state, subject to detecting that the inductor current has reached a pre-determined peak current. During the first operation mode, the power switch of the power converter may be commutated between the on-state and the off-state at a commutation cycle rate. The commutation cycle rate may be in the range of 100 kHz. The pre-determined peak current may be dependent on the dim level. In particular, the pre-determined peak current may be increased, if the dim level increases (and vice versa). As such, the power converter may be operated in a boundary conduction mode (BCM), when in the first operation mode. The first operation mode may be such that the SSL device is provided with a substantially constant SSL current, thereby emitting light at a substantially constant illumination level.

The controller may be configured to perform PWM dimming. For this purpose, the controller may be configured to operate the power converter in the first operation mode within a sequence of PWM pulses, and to operate the power converter in a second operation mode in between the PWM pulses. In the second operation mode, the power converter is operated for supplying energy to the SSL device at a second energy level. The second energy level is lower than the first energy level. In particular, the second energy level of energy may be such that the SSL device does not emit visible light. The second operation mode may be a maintenance mode during which energy is provided to the controller. For PWM dimming, the power converter may alternate between the first operation mode and the second operation mode. The relative duration of the first operation mode (relative to the second operation mode) may be controlled by the width and/or the PWM frequency of the PWM pulses. The PWM frequency may correspond to (in average) or may be (in average) a multiple of the cycle frequency.

For operating the power converter in the second operation mode, the controller may be configured to periodically put the power switch to on-state for a pre-determined on-duration, and to put the power switch to off-state for a pre-determined off-duration. On-states and off-states may alternate. The on-duration and the off-duration may be such that the transferred energy at the second energy level is sufficient for maintaining the controller in operation. On the other hand, the transferred energy at the second energy level may be insufficient for causing the SSL device to emit visible light. As such, the second operation mode may be used to ensure a continuous operation of the driver circuit, even at low dim levels.

By alternating the first operation mode and the second operation mode at the PWM frequency, the SSL device may be operated to generate light pulses at the PWM frequency. The PWM frequency may be sufficiently high (e.g. 100 Hz or higher) to ensure that the light pulses are not visible to a human eye. By doing this, the average illumination level may be further reduced, i.e. relatively low dim levels may be implemented.

It should be noted that the PWM frequency of the PWM pulses differs from the above mentioned commutation cycle rate of the power switch. The PWM frequency defines the (average) repetition rate of the PWM pulses, wherein the power converter is operated in the first operation mode during the PWM pulses. In other words, during the PWM pulses which occur at the PWM frequency, the power switch of the power converter may be switched between the on-state and the off-state at the commutation cycle rate. Consequently, the PWM frequency is typically substantially lower (in the range of 100 Hz) than the commutation cycle rate (in the range of 100 kHz).

The sequence of PWM pulses comprises PWM pulses (e.g. in average at the PWM frequency). The PWM pulses have a pulse width or pulse duration which impacts the dim level of the SSL device. The sequence of PWM pulses may be synchronized with the AC mains voltage. In particular, the controller may be configured to determine the sequence of PWM pulses based on the AC mains voltage (notably based on the rectified AC mains voltage).

In particular, the controller may be configured to determine a synchronization signal by comparing a voltage derived from the AC mains voltage (notably the rectified AC mains voltage) with a pre-determined threshold. The synchronization signal may comprise a sequence of pulses, wherein a pulse from the sequence of pulses corresponds to or is associated with a time instant when the voltage derived from the AC mains voltage (notably the rectified AC mains voltage) crosses the pre-determined threshold. In particular, a pulse may be generated each time that the voltage derived from the AC mains voltage (notably the rectified AC mains voltage) crosses the pre-determined threshold. Alternatively, the synchronization signal may comprise a rectangular function, wherein an edge of the rectangular function corresponds to or is associated with a time instant when the voltage derived from the AC mains voltage (notably the rectified AC mains voltage crosses) the pre-determined threshold. In particular, an edge of the rectangular function may be generated each time that the voltage derived from the AC mains voltage (notably the rectified AC mains voltage) crosses the pre-determined threshold. Hence, the synchronization signal may be indicative of an instantaneous phase and an instantaneous duration (or period) of the half-cycles of the voltage derived from the AC mains voltage (notably the rectified AC mains voltage).

Furthermore, the controller may be configured to determine the sequence of PWM pulses based on the synchronization signal such that the sequence of PWM pulses comprises one or more PWM pulses per half-cycle of the AC mains voltage. In addition, the sequence of PWM pulses may be determined such that the one or more PWM pulses for a current half-cycle (which is identified herein by the integer n) depend on the synchronization signal for at least one half-cycle prior to the current half-cycle n. The one or more PWM pulses for the current half-cycle typically also depend on the synchronization signal for the current half-cycle. By making the one or more PWM pulses (notably a phase and/or a duration or width of the one or more PWM pulses) dependent on previous half-cycles of the AC mains voltage, the noise and/or distortions comprised within the AC mains voltage may be reduced, thereby providing a stable time base for the sequence of PWM pulses, and thereby enabling the generation of flicker-free light, even in case of a distorted AC mains voltage.

The controller may be configured to determine a previous period for a previous half-cycle (e.g. the half-cycle identified by n−1). Furthermore, the controller may be configured to determine a period error based on the synchronization signal for the current half-cycle n and based on the previous period. A current period for the current half-cycle n may be determined by updating the previous period using the period error. As such, the current period for the current half-cycle n may be determined in a recursive manner. The one or more PWM pulses for the current half-cycle n may be determined based on the current period. In particular, the current period may be indicative of a duration and a phase of the one or more PWM pulses.

The controller may be configured to apply an attenuation to the period error for determining the current period for the current half-cycle n. The attenuation may be used to control a speed of adaptation of the controller regarding changes within the AC mains voltage. Furthermore, the attenuation may be used to control an extent at which noise and/or distortions are removed from the AC mains voltage.

The controller may be configured to determine a phase reference signal comprising a sequence of sawtooth sections, such that a duration of a sawtooth section for the previous half-cycle n−1 corresponds to the previous period. The phase reference signal may be indicative of a phase of the one or more PWM pulses which were generated for the previous half-cycle of the rectified AC mains voltage. The controller may be configured to determine a phase error based on the synchronization signal for the current half-cycle n and based on the phase reference signal for the previous half-cycle n−1. In addition, the controller may be configured to determine the current period for the current half-cycle n by updating the previous period also using the Jo phase error. By doing this, also phase variations of the AC mains voltage may be taken into account.

The controller may be configured to apply an attenuation to the phase error for determining the current period for the current half-cycle n. As indicated above, the attenuation may be used to control a speed of adaptation of the controller regarding changes within the AC mains voltage. Furthermore, the attenuation may be used to control an extent at which noise and/or distortions are removed from the AC mains voltage.

The controller may be configured to determine a phase signal comprising a sequence of phase sections for a sequence of half-cycles, respectively, such that a phase section for the current half-cycle n has a duration which corresponds to the current period and comprises a base sawtooth or an integer multiple of a base sawtooth. The base sawtooth may range from a pre-determined minimum value (e.g. 0) to a pre-determined maximum value. The controller may be configured to determine the one or more PWM pulses for the current half-cycle n based on the phase section for the current half-cycle n. In particular, the controller may be configured to generate a PWM pulse at time instants which correspond to a fixed excerpt of a base sawtooth. The fixed excerpt may depend on the dim level.

The controller may be configured to generate the phase reference signal and/or the phase signal using a clock signal having a pre-determined clock frequency.

According to a further aspect, a driver circuit for an SSL device is described. The driver circuit comprises a power converter. Furthermore, the driver circuit comprises a controller. The controller may comprise any of the features described in the present document.

According to a further aspect, a light bulb assembly is described. The light bulb assembly comprises an electrical connection module configured to electrically connect to a mains power supply, thereby providing an input voltage. Furthermore, the light bulb assembly comprises a driver circuit as described in the present document, configured to convert an input voltage into a drive signal for a solid state lighting (SSL) device. In addition, the light bulb assembly comprises the SSL device configured to provide light in accordance to the drive signal.

According to another aspect, a method for operating a controller and/or a driver circuit as outlined in the present document is described. The method may comprise steps which correspond to the features of the controller and/or driver circuit described in the present document. In particular, the method may be directed at operating a solid state lighting (SSL) device using a driver circuit. The driver circuit comprises a power converter configured to transfer energy from an input of the driver circuit to the SSL device. The energy at the input may be derived from an AC mains voltage comprising a sequence of cycles.

The method comprises determining a dim level for the SSL device. Furthermore, the method comprises determining a synchronization signal by comparing a rectified AC mains voltage with a pre-determined threshold. In addition, the method comprises determining a sequence of PWM pulses based on the synchronization signal such that the sequence of PWM pulses comprises one or more PWM pulses per half-cycle of the AC mains voltage, and such that the one or more PWM pulses for a current half-cycle n depend on the synchronization signal for at least one half-cycle prior to the current half-cycle n. Furthermore, the method comprises operating the power converter in a first operation mode for supplying energy to the SSL device at a first energy level within the sequence of PWM pulses, and operating the power converter in a second operation mode in between the PWM pulses. In the second operation mode the power converter is operated for supplying energy to the SSL device at a second energy level. The second energy level is lower than the first energy level, and the first energy level and/or a width of the one or more PWM pulses depend on the dim level.

The method may be implemented as hardware using logic components as described in the present document. Alternatively, the method may be implemented as software on a processor.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

In the present document, a light bulb "assembly" includes all of the components required to replace a traditional incandescent filament-based light bulb, notably light bulbs for connection to the standard electricity supply. In British English (and in the present document), this electricity supply is referred to as "mains" electricity, whilst in US English, this supply is typically referred to as power line. Other terms include AC power, line power, domestic power and grid power. It is to be understood that these terms are readily interchangeable, and carry the same meaning.

Typically, in Europe electricity is supplied at 230-240 VAC or 230 VAC+10%/−6%, at 50 Hz and in North America at 110-120 VAC or 114V-126V at 60 Hz. The principles set out in the present document apply to any suitable electricity supply, including the mains/power line mentioned, and a rectified AC power supply.

Figure 1:
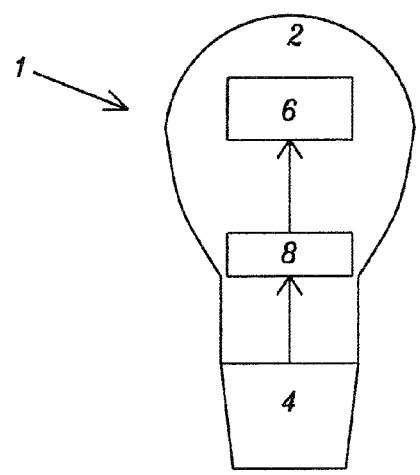
FIG. 1 illustrates a block diagram of an example light bulb assembly.

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 (also referred to as a SSL device) is provided within the housing 2. Examples for such light sources 6 are a solid state light source or SSL device 6, such as a light emitting diode (LED) or an organic light emitting diode (OLED). The light source 6 may be provided by a single light emitting device, or by a plurality of LEDs. Typical SSL devices 6 comprise a plurality of LEDs arranged in series, such that the on-voltage $V_{on}$ of the SSL device results from the sum of on-voltages of the individual LEDs. Typical values for on-voltages of SSL devices are in the range of 10V-100V.

Usually, the voltage drop across an SSL device 6 remains substantially constant (at the on-voltage $V_{on}$ of the SSL device 6), regardless the intensity of the light emitted by the SSL device 6. The intensity of the light emitted by the SSL device 6 is typically controlled by the drive current through the SSL device 6.

Driver circuit 8 is located within the bulb housing 2, and serves to convert supply electricity (i.e. the mains supply) received through the electrical connection module 4 into a controlled drive voltage and drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

Figure 2A:
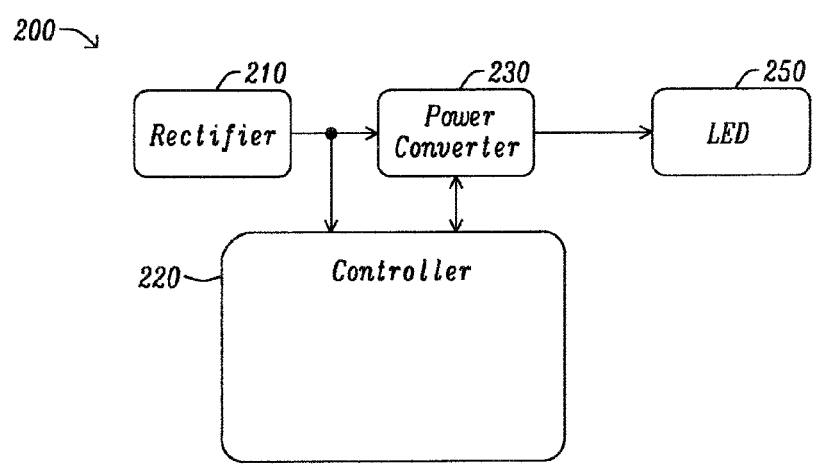
FIG. 2a shows a block diagram of example components of a driver circuit for a SSL device.

FIG. 2a illustrates example components of a driver circuit 8, 200 of an SSL device 6, 250. The driver circuit 200 comprises a rectifier 210 which receives alternating current (AC) supply electricity from the mains supply, and delivers a rectified current (DC) at its output. This DC power is received by a power converter 230 which serves to output a controlled DC drive voltage and/or a controlled drive current to the SSL device 250. The voltage and current characteristics of the drive signal (comprising the drive voltage and the drive current) are determined by the type and number of LEDs employed in the light source 6 (i.e. in the SSL device 250). The power supplied to the SSL device 250 is controlled in dependence upon desired operating conditions of the SSL device 250. In one example, the SSL device 250 includes a plurality of LEDs connected in series, and requires a drive signal having a drive voltage of 50V or more. In general, the drive voltage may be in the range of 10V to over 100V depending on the number of LEDs comprised within the SSL device 250.

The driver circuit 200 may further comprise a controller 220 configured to control the power converter 230 to generate an appropriate drive signal (i.e. an appropriate drive voltage and an appropriate drive current) as a function of the rectified mains voltage. In particular, the controller 220 may be configured to adapt a voltage conversion ratio of the power converter 230 based on the rectified (but varying) voltage provided by the rectifier 210. Furthermore, the controller 220 may be configured to control the power converter 230 to provide an appropriate drive current to the SSL device 250, thereby controlling the intensity of the light emitted by the SSL device 250.

The power converter 230 may comprise an inductive energy storage device (e.g. an inductor or a transformer) and a switch device. The switch device (also referred to as a power switch) may be controlled by the controller 220, and may be provided by a metal oxide semiconductor field effect transistor (MOSFET) device, or other device suitable for switching high voltage (for example, tens of volts). It should be noted, however, that the controller 220 may comprise the switch device itself, thereby directly controlling the provisioning of an appropriate drive voltage for the SSL device 250. The power converter 230 may comprise different circuit topology. For example, the power converter 230 may comprise a buck converter circuit, a boost converter circuit, a buck/boost converter circuit, a SEPIC (single-ended primary-inductor converter) circuit, and/or a fly-back converter circuit.

Figure 2B:
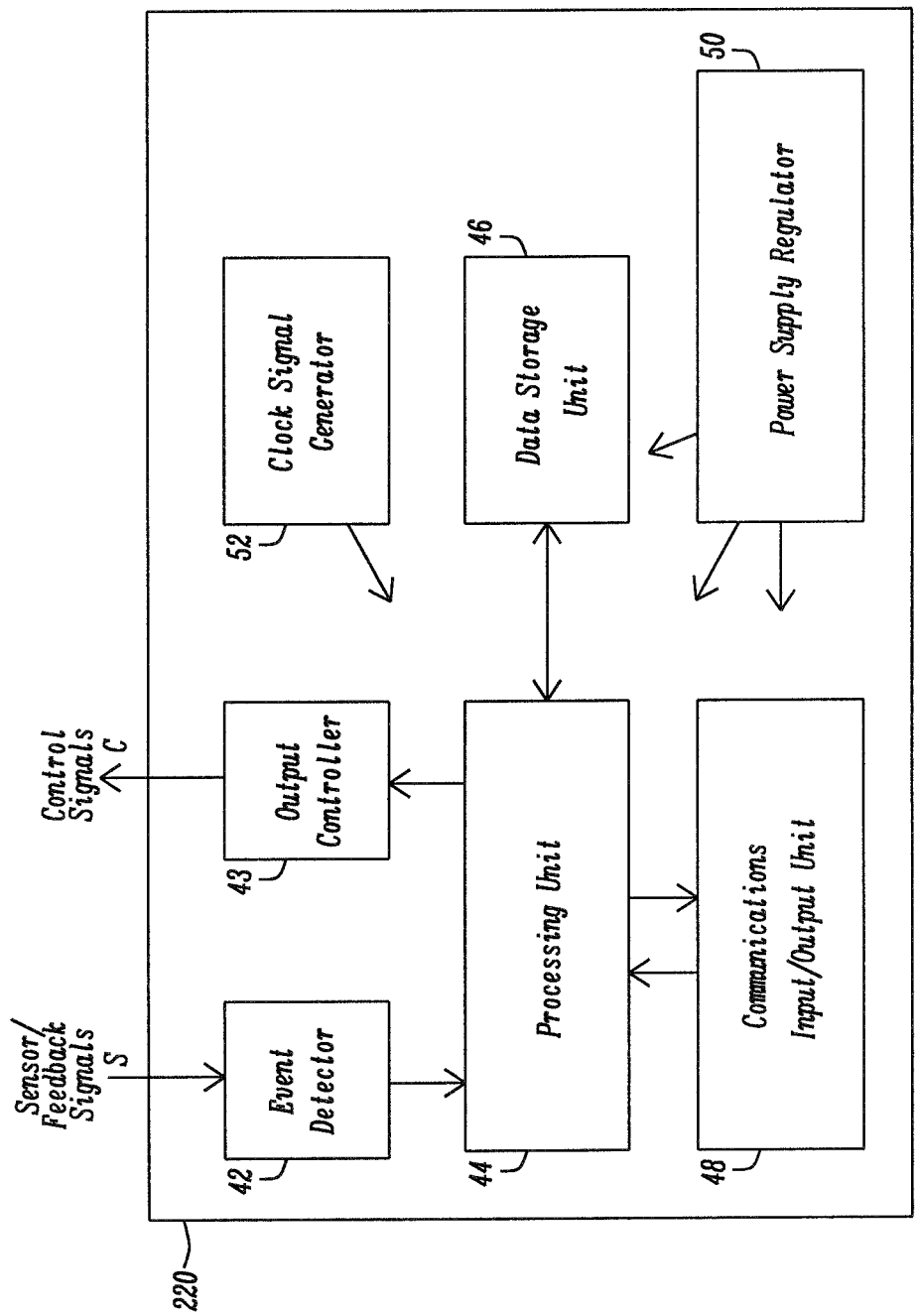
FIG. 2b shows a block diagram of example components of the controller of a driver circuit.

FIG. 2b illustrates an example block diagram of a controller 220. The controller 220 includes an event detector unit 42 connected for receiving sensor/feedback signals S (e.g. for receiving the rectified voltage provided by the rectifier 210), an output controller 43 for outputting control signals C (e.g. to the power converter 230), a processing unit 44 for overall control of the system, and a data storage unit 46 for storing data for use by the processing device. A communications input/output unit 48 may be provided for enabling the processing unit 44 to communicate with other devices, for example using a suitable wired or wireless communications protocol. The controller 220 also incorporates a power supply regulator 50, which supplies power to the devices within the controller 220, and a clock signal generator 52 (such as an oscillator circuit) for supplying a reference clock signal to the processing unit 44. The clock signal generator 52 may be configured to generate a clock signal from the sensor/feedback signals S (e.g. from the rectified voltage provided by the rectifier 210), thereby enabling a synchronization of the driver circuit 200 with the mains frequency. In other words, the clock signal generator 52 may make use of the periodicity of the mains cycle, in order to synchronize the driver circuit 200 with the mains cycle.

The processing unit 44 operates to generate the control signals C for controlling the switch device or devices in the power converter 230. Typically, the control signals are pulse-width modulated (PWM) signals that control the duty cycle (that is, the ratio of the length of an 'on-state' of the power switch over the length of a complete commutation cycle comprising an on-state phase and a succeeding off-state phase) of the switch device in the power converter 230, and hence to control the output drive voltage. In an embodiment, the controller 220 is implemented as a microcontroller or as an integrated circuit.

Figure 3:
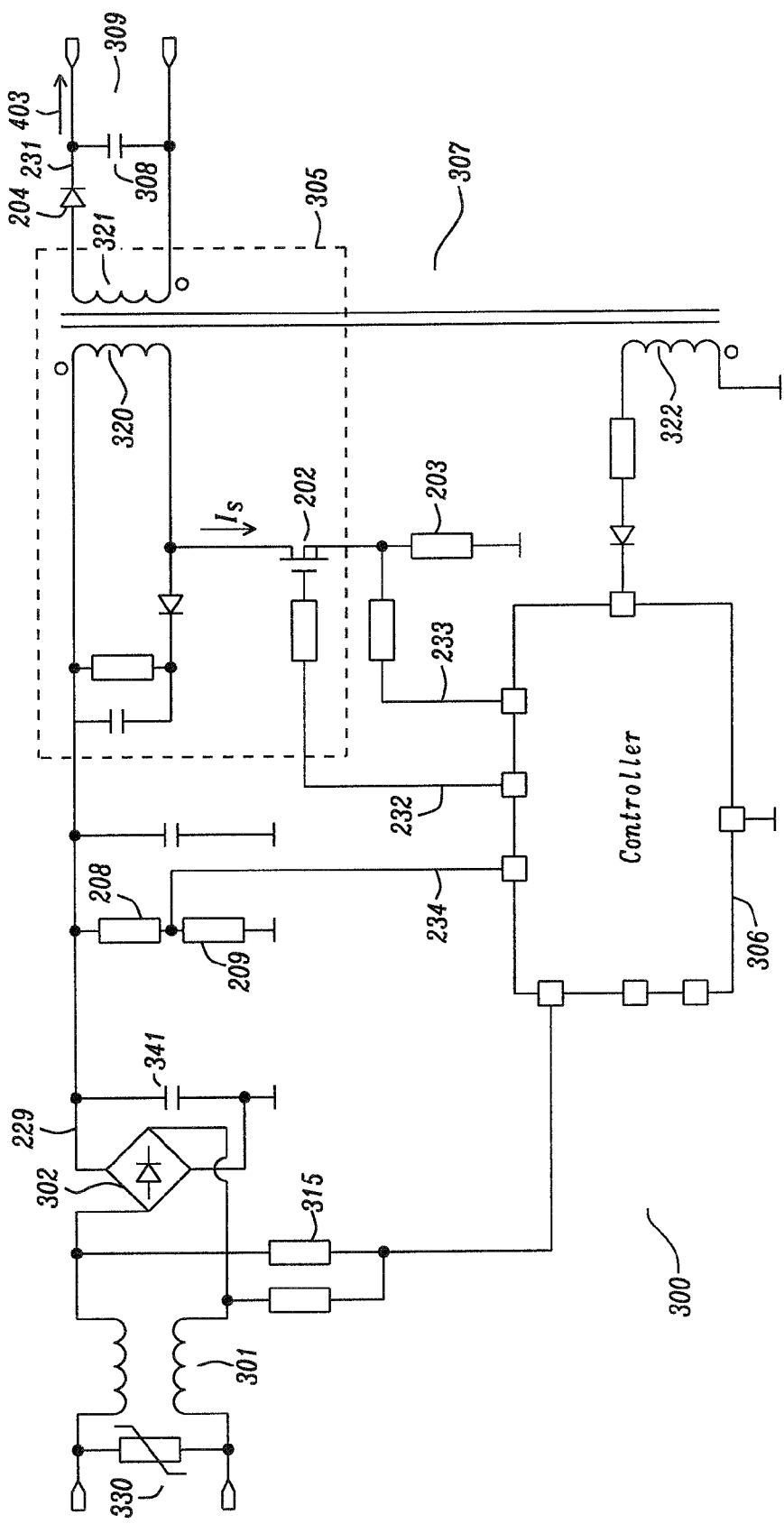
FIG. 3 illustrates a circuit diagram of an example driver circuit for a SSL device.

FIG. 3 shows a circuit diagram of an example driver circuit 300, 200, 8 of a light bulb assembly 1. The driver circuit 300 may be used to provide electrical power to a load 309, 250, 6 (which may e.g. be a light emitting diode, LED, or an LED array). The driver circuit 300 comprises an electromagnetic interference (EMI) filter unit 301 and a rectifier 302, 210, in order to generate a rectified input voltage 229 from the mains supply 330 at the capacitor 341. Furthermore, the driver circuit 300 comprises a controller 306 which is configured to control a power converter of the driver circuit 300. The controller 306 may comprise the controller 220 described above. The controller 306 may be started using one or more start-up resistors 315. Furthermore, the controller 306 may be coupled to a supply voltage capacitor (not shown) configured to provide the supply voltage Vcc to the controller 306 (which may be implemented e.g. as an integrated circuit, IC). In the illustrated example, the driver circuit 300 comprises a one-stage power converter 305 comprising a fly-back converter 305. It should be noted, however, that the driver circuit 300 may comprise a multi-stage power converter. Furthermore, it should be noted that the power converter 305 may comprise other types of converters, notably isolated or non-isolated converters. The fly-back converter 305 of FIG. 3 comprises a transformer 307 having a primary coil 320 and a secondary coil 321, and having an additional auxiliary coil 322, e.g. for measurement purposes. The auxiliary coil 322 may be used to provide information to the controller 306 regarding the output voltage 231 (also referred to as the drive voltage) of the driver circuit 300. Furthermore, the driver circuit 300 may comprise an output capacitor (or storage capacitor) 308 which stores the electrical power to be provided to the light source 309. The fly-back converter 305 comprises a diode 204 which is configured to prevent a reverse energy flow from the output of the fly-back converter 305 to the input of the fly-back converter 305 during an off-state of the switch 202 of the fly-back converter 305.

The input voltage to the power converter 305 corresponds to the rectified input voltage 229. The input voltage 229 may be sensed using input voltage sensing means 208, 209, thereby providing the sensed voltage signal 234 to the controller 306. In the illustrated example, the input voltage sensing means 208, 209 are implemented using a voltage divider comprising the resistors 208, 209. Furthermore, a sensed current signal 233 is determined using current sensing means 203, and is provided to the controller 306. The sensed current signal 233 is indicative of the current through the power switch 202 of the fly-back converter 305 or of the inductor current through the primary winding 320 of the transformer 307. In the illustrated example, the current sensing means are implemented using a shunt resistor 203 which is arranged in series with the power switch 202.

The controller 306 may be configured to determine a gate control signal 232 for putting the switch 202 of the second converter stage 305 into off-state once the current Is through the switch 202 reaches a pre-determined peak current Ip. The gate control signal 232 may be determined based on the sensed current signal 233 and/or based on a freewheeling signal which may be provided e.g. by the auxiliary winding 322 of the transformer 307. In particular, the gate control signal 232 may be set to put the power switch 202 into off-state, once the sensed current signal 233 has reached a pre-determined threshold value (which is typically dependent on the pre-determined peak current Ip). Furthermore, the gate control signal 232 may be set to put the power switch 202 into on-state, once freewheeling of the primary winding 320 of the fly-back converter 305 has been detected.

The driver circuit 300 may be configured to provide a load current or SSL current 403 to the SSL device 309 for generating flicker-free light. Furthermore, the driver circuit 300 may be configured to cover a high power factor and harmonic distortion. This should also be achieved in case of dimming of the SSL device, i.e. in cases when the dimming level of the SSL device is modified.

The level of the illumination which is emitted by the SSL device 309 may be modified by modifying the average current through the SSL device 309. The average current through the SSL device 309 may be modified in an analog manner, where the level of a substantially continuous current 403 through the SSL device 309 is modified. This may be referred to as analog or linear dimming. Alternatively or in addition, the average current through the SSL device 309 may be modified by providing a pulse width modulated (PWM), substantially discontinuous, current 403 to the SSL device 309. The latter is referred to as PWM dimming. In PWM dimming, the level of the SSL current 403 is typically based on the pulse width and period of a PWM signal, while in analog dimming the level of the SSL current 403 is based on the amplitude of an analog signal.

The dim level of an SSL device 309 may be set using a dimmer within the mains supply network. The dimmer may comprise a phase-cut dimmer and/or a digital dimmer. The driver circuit 300 may be configured to determine the dim level based on the waveform of the rectified input voltage 229. Alternatively or in addition, the dim level may be communicated to the driver circuit 300 using a dedicated communication path (e.g. via Bluetooth or Wireless LAN). The driver circuit 300 may be configured to control the power converter 305 based on the dim level. In particular, the driver circuit 300 may be configured to generate a pulse width modulated SSL current 403 for reducing the average level of the SSL current 403 and for reducing the dim level of the SSL device 309.

A possible way for operating the SSL device 309 in an intermittent manner may be to generate the pulse width modulated SSL current 403 based on the reference clock signal of the clock signal generator 52 of the controller 306, 220. A duty cycle of the pulse width modulated SSL current 403 may be used to define the dim level of the SSL device 309. This may be disadvantageous because in case of a single-stage power converter 305 with PFC (Power Factor Control) function, the rectified AC mains voltage 229 is fed directly to the input of the converter stage 305. As a result of this, the input voltage 229 of the power converter 305 corresponds to a half wave AC signal 229. As the reference clock signal is typically asynchronous with regards to the mains voltage 330, this leads to a situation that the pulse width modulated SSL current 403 may be determined based on different phases of the rectified AC mains voltage 229. Such a phase shift leads to an arbitrary change of the amount of energy which is transferred to the SSL device 309. The arbitrary change of the amount of energy which is provided to the SSL device 309 may lead to a visible flicker effect.

Figure 6:
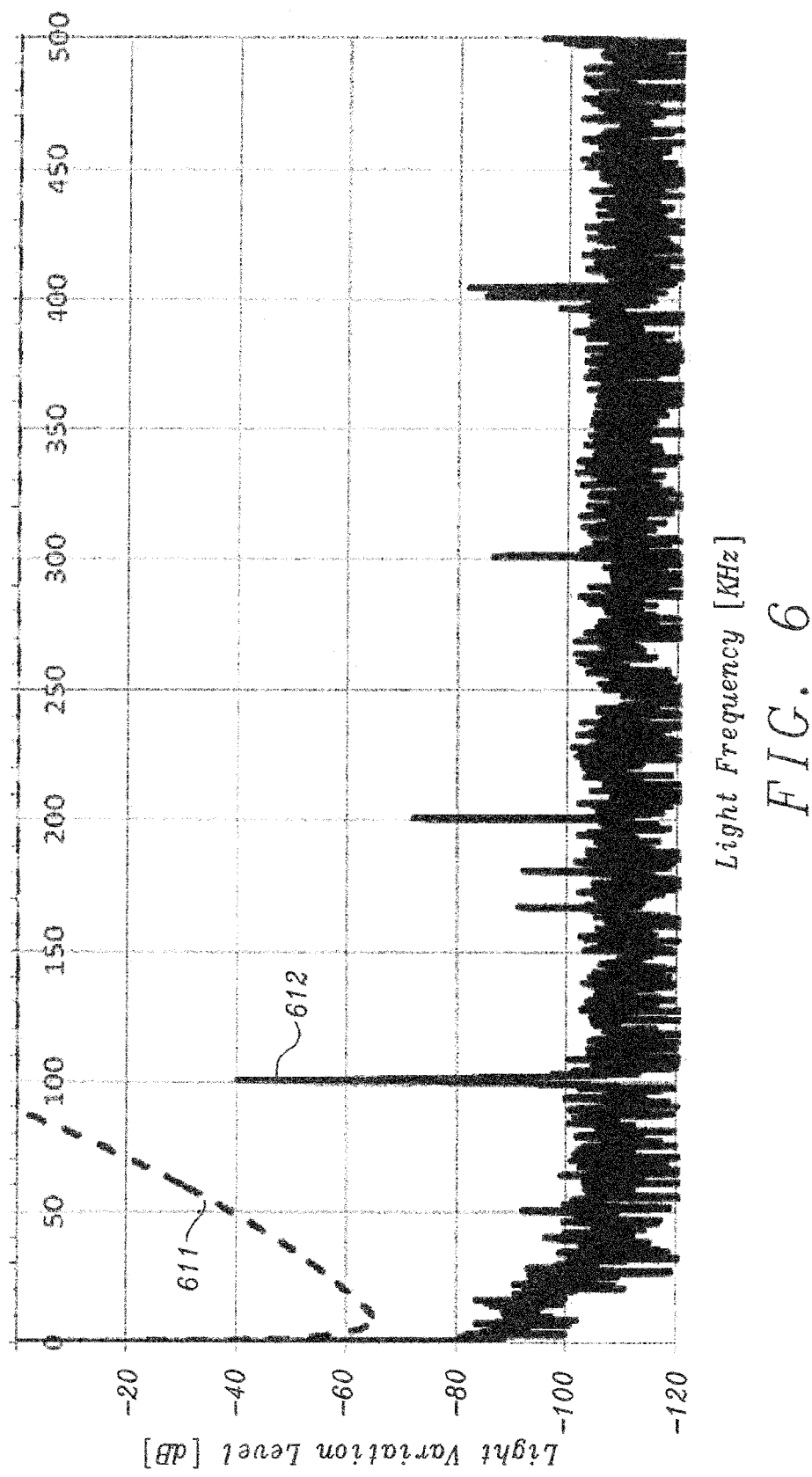
FIG. 6 a sensitivity curve of the human eye.

FIG. 6 illustrates that the human eye is most sensitive to visible flicker in the 4 Hz to 8 Hz region, with light variations of −60 dB with respect to the DC light level being seen. Dimming typically increases the sensitivity of an SSL device 309 to noise and disturbances. FIG. 6 shows the flicker sensitivity response 611 of the eye and the measured spectral response 612 of an SSL assembly 1. In the illustrated example there is no visible flicker, even though the emitted light has a relatively high 100 Hz component.

The present document describes a method and a corresponding controller 306, 220 which are configured to eliminate possible interferences between the input voltage 229 (i.e. between the rectified AC mains voltage 229) at the input of the power converter 305 and the pulse width modulated SSL current 403 which is provided to the SSL device 309. In other words, a method and controller are described which are configured to provide a pulse width modulated SSL current 403 that causes the emission of flicker free light, even if the rectified AC mains voltage 229 exhibits noise and distortions. For this purpose, the generation of the pulse width modulated SSL current 403 may be synchronized with the mains frequency. As a result of this, the energy transfer remains constant across different cycles of the mains supply 330. By doing this, a flicker effect of the SSL device 309 may be avoided.

As indicated above, the light level of the SSL device 309 is typically set in dependence of the PWM pulse width (e.g. the duty cycle) of the pulse width modulated SSL current 403 through the SSL device 309. The PWM frequency of the PWM pulses of the pulse width modulated SSL current 403 may be derived based on the mains supply 330. In particular, the PWM frequency may be derived from the mains frequency by a multiplication factor, i.e. the PWM frequency may be proportional to the mains frequency or to the cycle frequency, wherein the proportionality factor may be an integer.

For controlling the PWM operation of the SSL device 309, a PWM control signal may be used. The PWM control signal may comprise a sequence of PWM pulses, wherein a PWM pulse indicates a time interval during which a pulse of the SSL current 403 is to be generated by the driver circuit 300. As indicated above, the PWM frequency of the PWM pulses may be derived from the mains frequency or from the cycle frequency. The width of the PWM pulses may be used to control the dim level of the SSL device 309.

As indicated above, the average forward SSL current determines the brightness of the SSL device 309. The average SSL current can be dimmed using two approaches: The use of a linear dimming method by changing the average SSL current 403 directly and the use of PWM dimming by switching the SSL current 403 on and off at a relatively high PWM frequency, thereby reducing the average SSL current 403. The PWM frequency of the PWM control signal should be high enough in order to avoid visible flicker, which the human eye can detect. Furthermore, the PWM frequency of the PWM control signal should be stable, even subject to noise and distortions on the rectified AC mains voltage 229.

As a matter of fact, the mains supply 330 is typically not completely stable and exhibits variations in cycle duration and/or phase. Maintaining an accurate time-base that filters such a noise within the mains supply 330 allows the PWM control signal to be stable. In particular, an accurate time-base allows a controller 306 to place the PWM pulses within the mains cycle such that a sufficiently high Power Factor Corrected (PFC) figure is achieved. The time-base for generating a sequence of PWM pulses may be generated using a Phase-Lock-Loop (PLL) structure for locking a phase signal onto the mains cycle or onto a half-cycle of the mains supply 330. By doing this, transient noise within the rectified AC mains voltage 229 may be removed, thereby providing a stable time-base for generating the sequence of PWM pulses.

Figure 4:
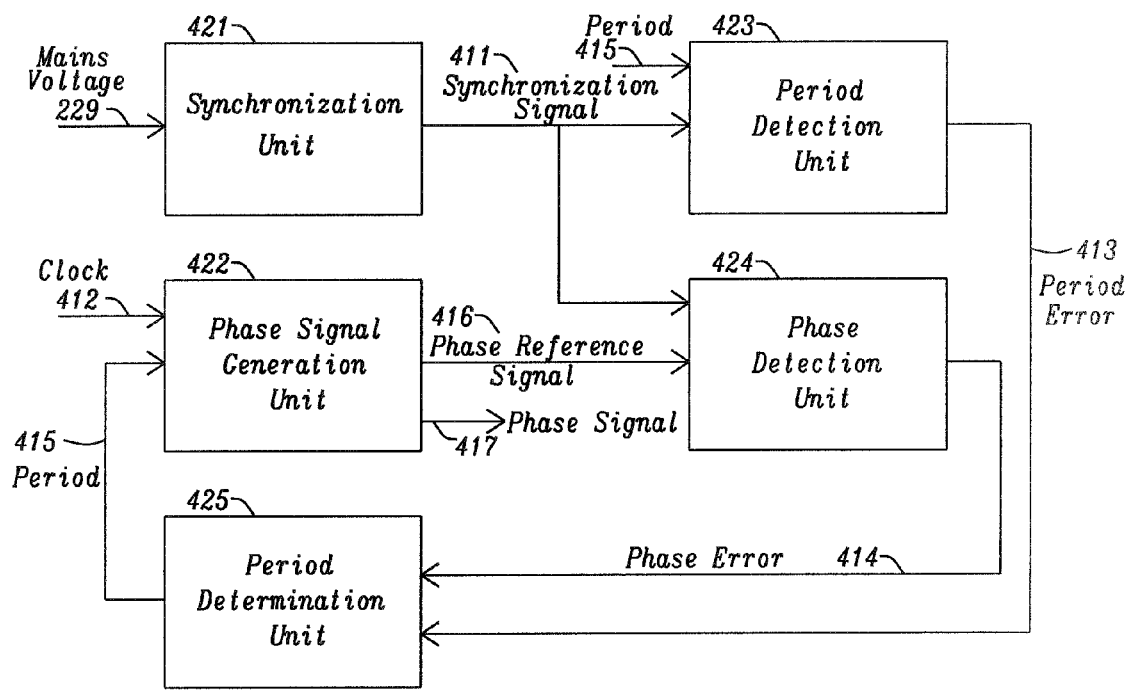
FIG. 4 shows a block diagram of example components of system for determining a phase signal for the generation of a sequence of PWM pulses.
Figure 5A:
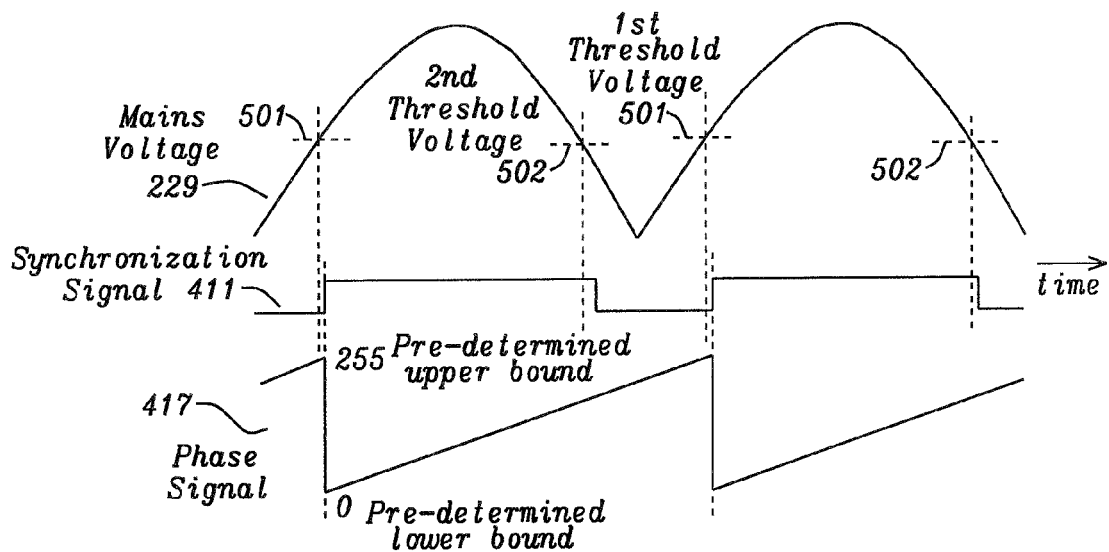
FIGS. 5a and 5b example phase signals.
Figure 5B:
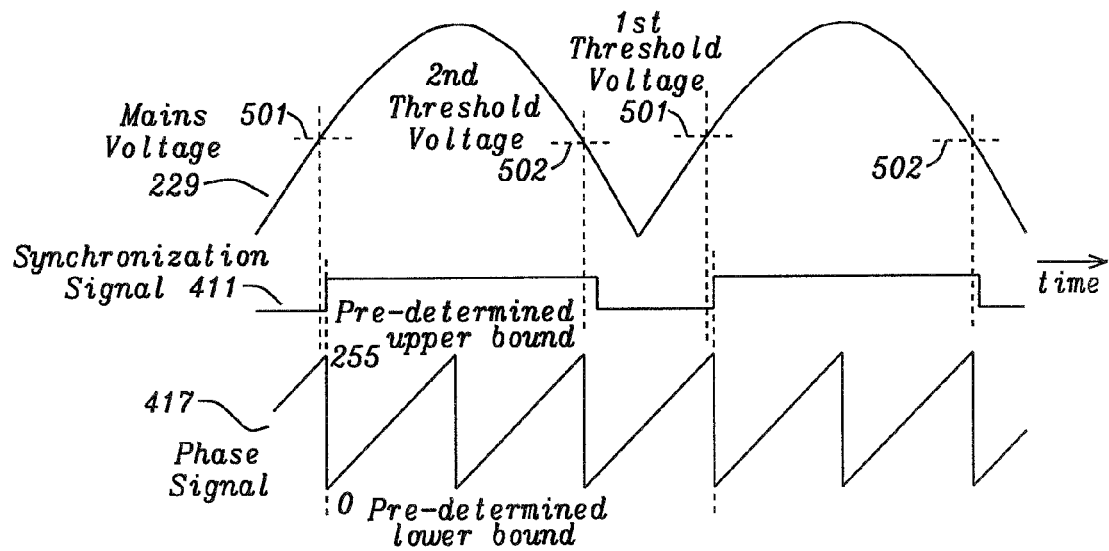

FIG. 4 shows an example system for determining a phase signal 417 which is locked onto the rectified AC mains voltage 229. The system may be implemented within the controller 306. The system comprises a synchronization unit 421 which is configured to generate a synchronization signal 411 based on the rectified AC mains voltage 229. In particular, the synchronization unit 421 may be configured to compare the amplitude of the rectified AC mains voltage 229 with a pre-determined threshold. The synchronization signal 411 may take on a first level (e.g. high), if the rectified AC mains voltage 229 exceeds the pre-determined threshold and the synchronization signal 411 may take on a second level (e.g. low), if the rectified AC mains voltage 229 is below the pre-determined threshold. Alternatively or in addition, the synchronization signal 411 may comprise a pulse, each time when the rectified AC mains voltage 229 traverses the pre-determined threshold (e.g. from below to above the threshold and/or from above to below the threshold). FIGS. 5a and 5b show an example synchronization signal 411 for an example rectified AC mains voltage 229. Furthermore, FIGS. 5a and 5b show a first threshold 501 which is used to determine the transition of the rectified AC mains voltage 229 on a rising slope of the rectified AC mains voltage 229.

In addition, FIGS. 5a and 5b show a second threshold 502 (which is smaller than the first threshold 501) which is used to determine the transition of the rectified AC mains voltage 229 on a falling slope of the rectified AC mains voltage 229.

The system in FIG. 4 further comprises a period detection unit 423. The period detection unit 423 is configured to determine a period error 413 based on the synchronization signal 411 and based on the period p(n−1) 415 used for the previous cycle (n−1). In other words, the period detection unit 423 may be configured to determine by how much the currently measured period (or cycle length) of the mains supply 330 for the current cycle n (given by the synchronization signal 411) differs from the period p(n−1) (or cycle length) which has been used for determining the sequence of PWM pulses (given by the period 415) for the previous cycle (n−1). Using a counter count(n), a currently measured period (given by the counter value count(n)) may be determined. The currently measured period may be subtracted from the period 415 to determine the period error $e_1(n)$ 413, i.e.

$$e_1(n) = \text{count}(n) - p(n-1).$$

Furthermore, the system comprises a phase detection unit 424 which is configured to determine a phase error 414 based on the synchronization signal 411 and based on a phase reference signal 416 (which may correspond to the phase signal 417) for the previous cycle (n−1). In particular, it may be determined whether the phase signal 417 (given by the phase reference signal 416) is in phase with the half cycles of the mains supply 330 (given by the synchronization signal 411). The phase reference signal 416 may correspond to a sawtooth with a cyclic count from 0 to a pre-determined maximum value within a time interval which is defined by the period p(n−1) 415. The phase detection unit 414 may be configured to determine the value of the sawtooth at the time instant when the synchronization signal 411 exhibits a transition or a pulse. This value may be indicative of the phase error $e_2(n)$ 414 between the phase signal 417 (which has been used for generating the sequence of PWM pulses in the previous cycle (n−1)) and current cycle n of the rectified AC mains voltage 229. The phase error $e_2(n)$ may be determined as, $$e_2(n) = \text{sawtooth value}(n),$$

wherein sawtooth value(n) is the value of the sawtooths of the phase reference signal 416 at the time instant when the synchronization signal 411 exhibits a transition or a pulse. Possibly a wrap around of the phase error may be taken into account, by subtracting half of the maximum count of the sawtooth from sawtooth value(n) for determining the phase error $e_2(n)$.

The system comprises a period determination unit 425 which is configured to determine the period p(n) 415 for the current cycle n (which is used as the basis for determining the phase signal 417 for the current cycle n) based on the period error 413 and based on the phase error 414. In particular, the period p(n) 415 may be determined in a recursive manner, by updating a previously used period p(n−1). By way of example, the current period p(n) 415 at the half cycle n may be determined as $$p(n) = p(n-1) + a \cdot e_1(n) + b \cdot e_2(n).$$

wherein $e_1(n)$ is the period error 413 at half cycle n, $a \in \{0,1\}$ is an attenuation for the period error 413, $e_1(n)$ is the phase error 414 at half cycle n, and $b \in \{0,1\}$ is an attenuation for the phase error 414. By setting the attenuations, the speed of adaption and/or the amount of noise within the phase signal 417 may be controlled. Notably by reducing the attenuations, the speed of adaption and the amount of noise may be reduced.

The system further comprises a phase signal generation unit 422 which is configured to generate the phase signal 417 based on the period p(n) 415 and based on a clock signal 412. The phase signal 417 may comprise a base sawtooth which varies from a pre-determined lower bound (e.g. 0) to a pre-determined upper bound (e.g. 255). The ramp of the sawtooth may be increased or reduced based on the period p(n) 415. In particular, the phase signal 417 may be determined such that the length of a sawtooth period for the half cycle n corresponds to the period p(n) for the half cycle n. The phase signal generation unit 422 may be configured to generate a phase signal 417 which comprises one or more base sawtooths per sawtooth period. This is illustrated in FIGS. 5a and 5b, where a phase signal 417 which comprises a single base sawtooth per sawtooth period (FIG. 5a) and a phase signal 417 which comprises three base sawtooths per sawtooth period (FIG. 5b) are shown. The sawtooth period corresponds to the period p(n) for the half cycle n.

Overall, the system shown in FIG. 4 allows for the generation of a phase signal 417 which may be used to reliably place one or more PWM pulses within each half cycle of a rectified AC mains voltage 229. A PWM pulse may e.g. be placed at a pre-determined excerpt of each base sawtooth of the phase signal 417. By increasing the width of the excerpt, the width of the PWM pulses may be increased (and vice versa). As such, the phase signal 417 may be used to determine a stable sequence of PWM pulses for generating flicker-free light.

Figure 7:
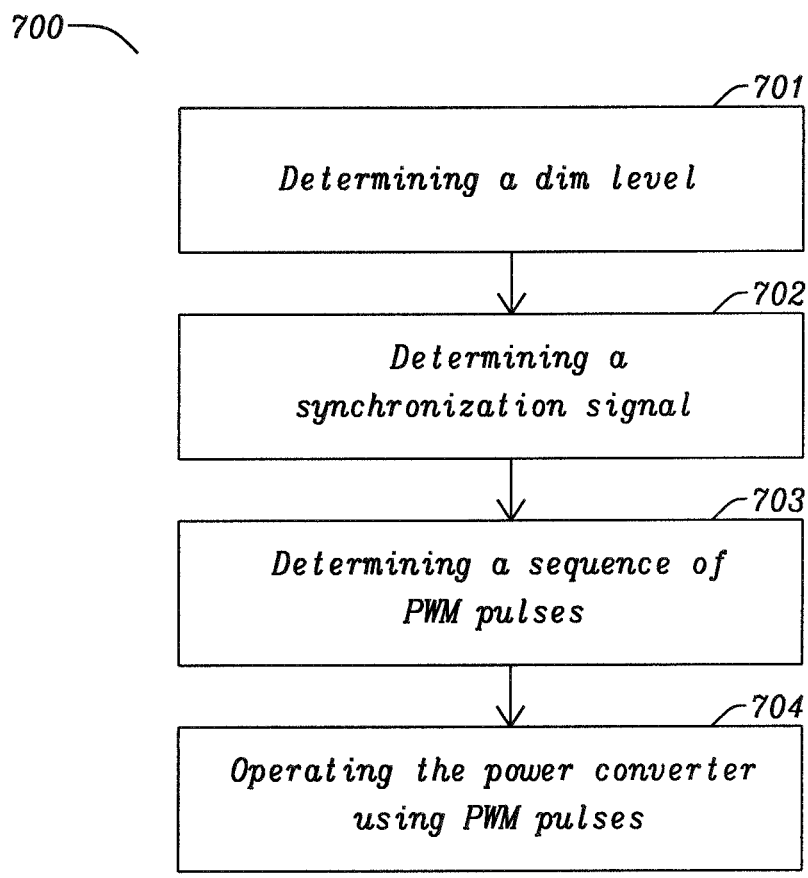
FIG. 7 shows a flow chart of an example method for operating a SSL device in a flicker-free manner.

FIG. 7 shows a flow chart of an example method 700 for operating an SSL device 309 using a driver circuit 300. The driver circuit 300 comprises a power converter 305 configured to transfer energy from an input of the driver circuit 300 to the SSL device 309. The driver circuit 300 is configured to derive the energy at the input from an AC mains voltage at a mains frequency and comprising a sequence of cycles. The method 700 comprises determining 701 a dim level for the SSL device 309. Furthermore, the method 700 comprises determining 702 a synchronization signal 411 by comparing a rectified AC mains voltage 229 with a pre-determined threshold 501, 502. As such, the synchronization signal 411 is indicative of the length or duration of a half-cycle of the AC mains voltage. The length or duration of a half-cycle of the AC mains voltage may vary due to noise and/or distortions of the AC mains voltage. The method 700 is directed at removing such noise and/or distortions in order to provide a stable time base for generating a sequence of PWM pulses for the generation of flicker-free light.

The method 700 comprises determining 703 a sequence of PWM pulses 517 based on the synchronization signal 411 such that the sequence of PWM pulses 517 comprises one or more PWM pulses per half-cycle of the AC mains voltage. Furthermore, the sequence of PWM pulses 517 is determined such that the one or more PWM pulses for a current half-cycle n depend on the synchronization signal 411 for at least one half-cycle prior to the current half-cycle n. Furthermore, the one or more PWM pulses for the current half-cycle n typically depend on the synchronization signal 411 for the current half-cycle n. By taking into account the synchronization signal 411 for a plurality of half-cycles, variations of the duration of the half-cycles of the AC mains voltage may be smoothed out, thereby providing a stable time base for generating the PWM pulses.

The method 700 further comprises operating 704 the power converter 305 in a first operation mode for supplying energy to the SSL device 309 at a first energy level within the sequence of PWM pulses 517, and operating the power converter 305 in a second operation mode in between the PWM pulses 517, wherein in the second operation mode the power converter 305 is operated for supplying energy to the SSL device 309 at a second energy level. The second energy level is lower than the first energy level, thereby generating a PWM modulated SSL current 403. Furthermore, the first energy level and/or a width of the one or more PWM pulses depend on the dim level, thereby ensuring that the SSL device 309 emits the appropriate level of light.

As such, a PLL may be used to track a period 415 in time, using a low-pass feedback loop filter within a structure shown in FIG. 4, wherein the period 415 is used for generating a sequence of PWM pulses. The structure accommodates 50/60 Hz main supplies and slight variations from the mains supply. The time base (i.e. the phase signal 417) may be used to generate the sequence of PWM pulses, e.g. a plurality of PWM pulses per half-cycle, thereby reducing or removing a visible flicking when a light bulb 1 is dimmed.

The PLL structure of FIG. 4 is configured to track the synchronization signal 411 over one or two half-cycles of the mains supply 330. This may be used to remove even-odd effects of DC offset within the mains supply 330. Using a clock (e.g. at 10 MHz) the phase signal 417 may be generated, wherein the phase signal 417 may comprise 1, 2, 3, 4, 5, 6, 7 or more ramps or base sawtooths per half-cycle. The number of pulses per half-cycle may be user selectable. A limitation of the feedback may be achieved using adjustable attenuations. The one or more PWM pulses of a half-cycle may be centered on the mains peak (possibly offset to the ramp of the phase signal 417). The duration of the PWM pulses may be a fixed number of counts of a ramp of the phase signal 417.

The controller 306 may be configured to initialize a value for the period 415, in order to allow for a fast locking. For this purpose, the period 415 may be determined initially (e.g. for 3-5 half-cycles) only based on the period determination unit 423 and based on the period error 413 (without taking into account the phase error 414). As a result of this, a fast conversion of the period 415 may be achieved. Alternatively or in addition, the attenuations a and/or b may be varied, in order to enable a fast conversion of the period 415 and of the phase signal 417. In particular, the attenuations a and/or b may be set relatively high at the start of operation and may be gradually decreased subsequently.

It should be noted that the description and drawings merely illustrate the principles of the proposed methods and systems. Those skilled in the art will be able to implement various arrangements that, although not explicitly described or shown herein, embody the principles of the invention and are included within its spirit and scope.

Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A controller for a driver circuit of a solid state lighting, referred to as SSL, device, wherein the driver circuit comprises a power converter configured to transfer energy from an input of the driver circuit to the SSL device; wherein the energy at the input is derived from an AC mains voltage comprising a sequence of cycles; wherein the controller is configured to
- determine a dim level for the SSL device;
- determine a synchronization signal (411) by comparing a voltage derived from the AC mains voltage with a pre-determined threshold;
- determine a sequence of PWM pulses based on the synchronization signal such that
  - the sequence of PWM pulses comprises one or more PWM pulses per half-cycle of the AC mains voltage; and
  - the one or more PWM pulses for a current half-cycle n depend on the synchronization signal (411) for at least one half-cycle prior to the current half-cycle n where n is an integer; and
- operate the power converter in a first operation mode for supplying energy to the SSL device at a first energy level within the sequence of PWM pulses, and operate the power converter in a second operation mode in between the PWM pulses; wherein in the second operation mode the power converter is operated for supplying energy to the SSL device at a second energy level; wherein the second energy level is lower than the first energy level; and wherein the first energy level and/or a width of the one or more PWM pulses depend on the dim level.

2. The controller of claim 1, wherein a phase and/or a duration of the one or more PWM pulses for the current half-cycle n depends on the synchronization signal for at least one half-cycle prior to the current half-cycle n.

3. The controller of claim 1, wherein the controller is configured to
- determine a previous period for a previous half-cycle n−1;
- determine a period error based on the synchronization signal for the current half-cycle n and based on the previous period;
- determine a current period for the current half-cycle n by updating the previous period using the period error; and
- determine the one or more PWM pulses for the current half-cycle n based on the current period.

4. The controller of claim 3, wherein the controller is configured to determine the current period for the current half-cycle n in a recursive manner.

5. The controller of claim 3, wherein the controller is configured to apply an attenuation to the period error for determining the current period for the current half-cycle n.

6. The controller of claim 3, wherein the controller is configured to
- determine a phase reference signal comprising a sequence of sawtooth sections, such that a duration of a sawtooth section for the previous half-cycle n−1 corresponds to the previous period;
- determine a phase error based on the synchronization signal for the current half-cycle n and based on the phase reference signal for the previous half-cycle n−1; and
- determine the current period for the current half-cycle n by updating the previous period also using the phase error.

7. The controller of claim 6, wherein the controller is configured to apply an attenuation to the phase error for determining the current period for the current half-cycle n.

8. The controller of claim 3, wherein the controller is configured to
- determine a phase signal comprising a sequence of phase sections for a sequence of half-cycles, respectively, such that a phase section for the current half-cycle n has a duration which corresponds to the current period and comprises a base sawtooth or an integer multiple of a base sawtooth; wherein the base sawtooth ranges from a pre-determined minimum value to a pre-determined maximum value; and
- determine the one or more PWM pulses for the current half-cycle n based on the phase section for the current half-cycle n.

9. The controller of claim 8, wherein the controller is configured to generate a PWM pulse at time instants which correspond to a fixed excerpt of a base sawtooth; wherein the fixed excerpt depends on the dim level.

10. The controller of claim 6, wherein the controller is configured to generate the phase reference signal and/or the phase signal using a clock signal having a pre-determined clock frequency.

11. The controller of claim 1, wherein the synchronization signal comprises
- a sequence of pulses, wherein a pulse from the sequence of pulses corresponds to a time instant when the voltage derived from the AC mains voltage crosses the pre-determined threshold; or
- a rectangular function, wherein an edge of the rectangular function corresponds to a time instant when the voltage derived from the AC mains voltage crosses the pre-determined threshold.

12. The controller of claim 1, wherein the power converter comprises
- an inductor configured to store energy from the input of the driver circuit and release the stored energy towards the SSL device; and
- a power switch which is arranged in series with the inductor and which is configured to enable an inductor current through the inductor, when in on-state.

13. The controller of claim 12, wherein for operating the power converter in the first operation mode, the controller is configured to repeatedly
- put the power switch to an on-state, subject to detecting freewheeling of the inductor; and
- put the power switch to an off-state, subject to detecting that the inductor current has reached a pre-determined peak current; wherein the pre-determined peak current is dependent on the dim level.

14. The controller of claim 12, wherein for operating the power converter in the second operation mode, the controller is configured to periodically
- put the power switch to an on-state for a pre-determined on-duration; and
- put the power switch to an off-state for a pre-determined off-duration; wherein the on-duration and the off-duration are such that the transferred energy at the second energy level is sufficient for maintaining the controller in operation.

15. A method for operating a solid state lighting, referred to as SSL, device using a driver circuit, wherein the driver circuit comprises a power converter to transfer energy from an input of the driver circuit to the SSL device; wherein the energy at the input is derived from an AC mains voltage comprising a sequence of cycles; wherein the method comprises the steps of:
- determining a dim level for the SSL device;
- determining a synchronization signal by comparing a voltage derived from the AC mains voltage with a pre-determined threshold;
- determining a sequence of PWM pulses based on the synchronization signal such that the sequence of PWM pulses comprises one or more PWM pulses per half-cycle of the AC mains voltage; and the one or more PWM pulses for a current half-cycle n depend on the synchronization signal for at least one half-cycle prior to the current half-cycle n where n is an integer; and operating the power converter in a first operation mode for supplying energy to the SSL device at a first energy level within the sequence of PWM pulses, and operating the power converter in a second operation mode in between the PWM pulses; wherein in the second operation mode the power converter is operated for supplying energy to the SSL device at a second energy level; wherein the second energy level is lower than the first energy level; and wherein the first energy level and/or a width of the one or more PWM pulses depend on the dim level.

16. The method of claim 15, wherein a phase and/or a duration of the one or more PWM pulses for the current half-cycle n depends on the synchronization signal for at least one half-cycle prior to the current half-cycle n.

17. The method of claim 15, further comprising the steps of:
determining a previous period for a previous half-cycle n−1;
determining a period error based on the synchronization signal for the current half-cycle n and based on the previous period;
determining a current period for the current half-cycle n by updating the previous period using the period error; and
determining the one or more PWM pulses for the current half-cycle n based on the current period.

18. The method of claim 17, further comprising the step of:
determining the current period for the current half-cycles in a recursive manner.

19. The method of claim 17, further comprising the step of:
applying an attenuation to the period error for determining the current period
for the current half-cycle n.

20. The method of claim 17, further comprising the steps of:
determining a phase reference signal comprising a sequence of sawtooth sections, such that a duration of a sawtooth section for the previous half-cycle n−1 corresponds to the previous period;
determining a phase error based on the synchronization signal for the current half-cycle n and based on the phase reference signal for the previous half-cycle n−1; and
determining the current period for the current half-cycle n by updating the previous period also using the phase error.

21. The method of claim 20, further comprising the step of:
applying an attenuation to the phase error for determining the current period for the current half-cycle n.

22. The method of claim 17, further comprising the steps of:
determining a phase signal comprising a sequence of phase sections for a sequence of half-cycles, respectively, such that a phase section for the current half-cycle n has a duration which corresponds to the current period and comprises a base sawtooth or an integer multiple of a base sawtooth; wherein the base sawtooth ranges from a pre-determined minimum value to a pre-determined maximum value; and
determining the one or more PWM pulses for the current half-cycle n based on the phase section for the current half-cycle n.

23. The method of claim 22, further comprising the step of:
generating a PWM pulse at time instants which correspond to a fixed excerpt of a base sawtooth; wherein the fixed excerpt depends on the dim level.

24. The method of claim 20, further comprising the step of:
generating the phase reference signal and/or the phase signal using a clock signal having a pre-determined clock frequency.

25. The method of claim 15, wherein the synchronization signal comprises
a sequence of pulses, wherein a pulse from the sequence of pulses corresponds to a time instant when the voltage derived from the AC mains voltage crosses the pre-determined threshold; or
a rectangular function, wherein an edge of the rectangular function corresponds to a time instant when the voltage derived from the AC mains voltage crosses the pre-determined threshold.

26. The method of claim 15, further comprising the steps of:
storing energy in an inductor from the input of the driver circuit and release the stored energy towards the SSL device; and
arranging a power switch in series with the inductor and which enables an inductor current through the inductor, when in on-state.

27. The method of claim 26, further comprising the steps of:
operating the power converter in the first operation mode,
placing repeatedly the power switch to an on-state, subject to detecting freewheeling of the inductor; and
placing repeatedly the power switch to an off-state, subject to detecting that the inductor current has reached a pre-determined peak current; wherein the pre-determined peak current is dependent on the dim level.

28. The method of claim 26, further comprising the steps of:
operating the power converter in the second operation mode,
placing periodically the power switch to an on-state for a pre-determined on-duration; and
placing periodically the power switch to an off-state for a pre-determined off-duration; wherein the on-duration and the off-duration are such that the transferred energy at the second energy level is sufficient for maintaining the controller in operation.

* * * * *